April 6, 1965 C. P. CLARE 3,177,315

SEALED SWITCH UNIT SUBPANEL ASSEMBLY MOUNTED ON CIRCUIT BOARD

Filed Jan. 17, 1963 2 Sheets-Sheet 1

INVENTOR.
CARL P. CLARE
BY
Mason, Kolehmainen, Rathburn and Wyss
ATTORNEYS.

April 6, 1965 C. P. CLARE 3,177,315

SEALED SWITCH UNIT SUBPANEL ASSEMBLY MOUNTED ON CIRCUIT BOARD

Filed Jan. 17, 1963 2 Sheets-Sheet 2

INVENTOR.
CARL P. CLARE
BY
Mason, Kolehmainen, Rathburn and Wyss
ATTORNEYS.

United States Patent Office 3,177,315
Patented Apr. 6, 1965

3,177,315
SEALED SWITCH UNIT SUBPANEL ASSEMBLY MOUNTED ON CIRCUIT BOARD

Carl P. Clare, Arlington Heights, Ill., assignor to C. P. Clare & Company, Chicago, Ill., a corporation of Delaware Filed Jan. 17, 1963, Ser. No. 252,086
9 Claims. (Cl. 200—87)

This invention relates to an electrical switching assembly and, more specifically, to switching assemblies having printed circuit panels with electrical components, such as resistors, capacitors, etc., mounted thereon.

In the copending application of Arthur J. Koda, Serial No. 60,157, filed February 8, 1960, now U.S. Patent No. 3,114,019, which patent is assigned to the same assignee as the present application, there is disclosed a switching assembly including a printed circuit panel having one or more openings in which are disposed one or more sealed switch units mechanically and electrically connected to the panel and the printed circuitry thereon. These assemblies are usually constructed using a number of sealed switches, with common or individual windings, on a single printed circuit board so that a number of different switching operations are performed by the board.

However, many circuit applications require only a single sealed switch so that it would be desirable to produce single switch assemblies as a subassembly or subpanel for attachment to a larger main printed circuit panel. This is true because a manufacturer of the switch subassemblies may not be equipped to or desire to manufacture a complete printed circuit panel containing one or two switches because of the number of different and varied circuits required by different customers. The ability to manufacture these different circuits would require maintaining an inventory of a great number of component parts, such as different sized resistors, capacitors, and different types of transistors. In some instances, the customer may wish to build his own printed circuit panel and attach the switching subassembly thereto or he may desire to purchase printed circuit panels from other than the manufacturer of the sealed switches. By providing a subpanel having one or more dry contact or dry reed switches or mercury wetted switches mounted thereon, it is possible for the customer to stock these subassemblies for use in new manufacturing and as repair and maintenance parts. However, the construction of the switching subassembly should possess all of the desirable characteristics of the larger capacity assemblies and should be adapted for modern assembling and manufacturing techniques.

Accordingly, one object of the present invention is to provide a new and improved switching assembly.

Another object of the present invention is to provide a new and improved switching assembly including a sealed switch unit disposed in an opening on a printed circuit subpanel which can be electrically and mechanically connected to a main printed circuit panel.

Another object of the present invention is to provide a new and improved switching assembly in which a main panel is provided with a opening to accommodate at least a portion of the switch unit to reduce the overall thickness of the complete assembly.

A further object is the provision of a new and improved switching assembly including means for mechanically securing a subpanel to a main panel and means for electrically interconnecting the circuitry on these panels.

An additional object of the present invention is to provide a new and improved switching assembly in which a sealed switch unit having a winding thereon is positioned within aligned openings provided on a main panel and a subpanel so that the overall thickness or lateral dimension of the completed assembly is no larger than the thickness of the switching assembly.

Another object is the provision of a new and improved switching assembly having a sealed switch mounted in an opening on a printed circuit subpanel which includes means for rapidly and easily mounting the switching subpanel on a main printed circuit panel by methods such as flow soldering one surface of the main panel.

It is a still further object of the present invention to provide a switching assembly in which a subassembly with a switching unit mounted thereon is enclosed in a thin, flexible dielectric layer and is then assembled on a main panel.

In accordance with these and many other objects and advantages, one embodiment of the present invention comprises a switching assembly including a dry or wet contact sealed switch mounted in an opening in a printed circuit subpanel and electrically and mechanically connected to the printed circuit on the subpanel. The subpanel, which is sealed within an envelope of thin dielectric material, also includes a plurality of terminals or connectors which are connected to the switch and its winding and which project outwardly from the plane of the subpanel through the dielectric envelope. These subassemblies or subpanels can now be used in the manner of other electronic components to manufacture a main printed circuit panel. For example, the main printed circuit panel can be provided with connectors for receiving the terminals to mount the subpanel adjacent one surface of the main panel with the sealed switch and winding disposed in an opening in the main panel that is aligned with the opening in the subpanel. The subpanel is mechanically connected to the main panel and the sealed switch is connected to the main panel printed circuit by joining the terminals and connectors, as by a soldering operation. The use of the aligned openings on the main and subpanels permits the use of separately manufactured switching subassemblies without unduly increasing the thickness of the completed main panel assembly.

Many other objects and advantages of the present invention will become apparent from considering the following detailed description in conjunction with the drawings, in which.

Figure 1:
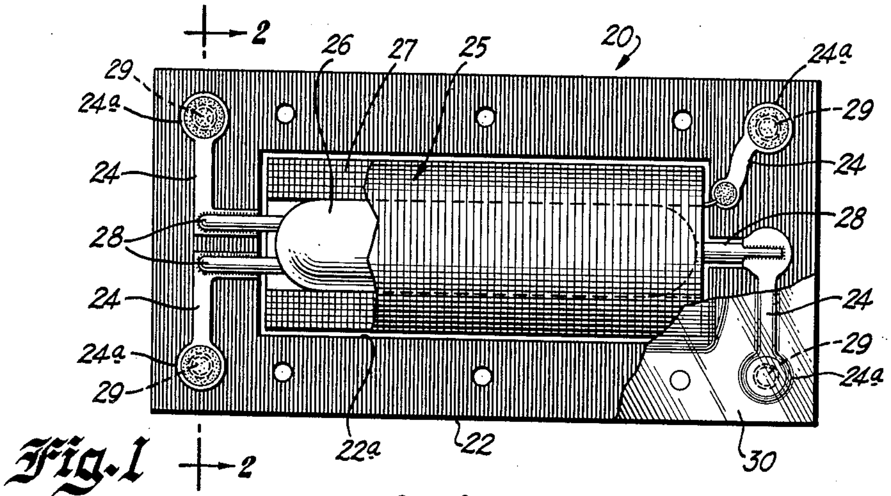
FIG. 1 is a plan view of a sealed switch subpanel embodying the present invention.
Figure 2:
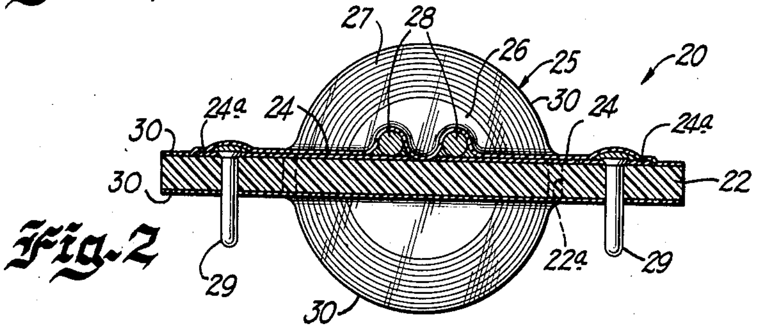
FIG. 2 is a sectional view taken along line 2—2 of FIG. 1.
Figure 3:
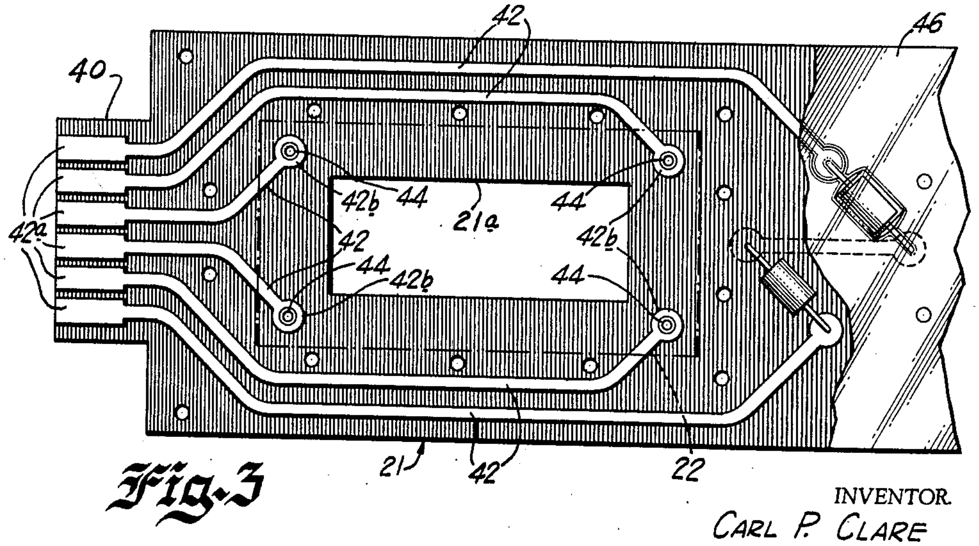
FIG. 3 is a fragmentary plan view of a main printed circuit panel forming a part of a switching assembly embodying the present invention.
Figure 4:
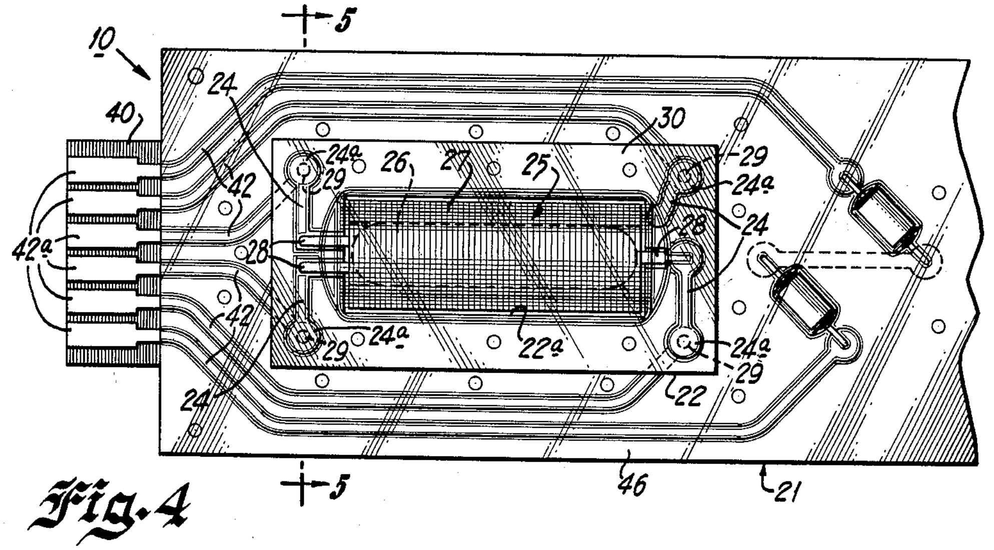
FIG. 4 is a plan view of a switching assembly which embodies the present invention and which includes the main panel shown in FIG. 3 and subpanel shown in FIGS. 1 and 2.

Referring now more specifically to the drawings, therein is illustrated a switching assembly, indicated generally as 10, which is constructed in accordance with the present invention and which includes a switching subassembly subpanel 20 (FIGS. 1 and 2) which is mounted on and electrically connected to a main printed circuit panel 21 (FIG. 3). The switching subassembly 20 can be separately manufactured and is subsequently assembled to form a part of the main printed circuit panel 21.

The subassembly 20 includes a dielectric subpanel 22 provided with a printed circuit pattern on at least one surface thereof including a plurality of thin metallic conducting strips 24. The subpanel 22 also includes an opening 22a spaced inwardly from its edges for receiving a sealed switch unit 25 having a hermetically sealed tubular dielectric envelope 26 on which is mounted an operating winding 27. A plurality of terminals 28 extending from the opposite ends of the envelope 26 are connected to the strips 24 adjacent the edges of the opening 22a to mechanically mount the switch 25 and the winding 27 on the subpanel 22. These connections and others made between the leads to the winding 27 and the strips 24 also electrically interconnect the printed circuit pattern and the switching components. Although the illustrated switch 25 is a mercury contact relay, this switch also could comprise one or more dry contact or magnetic reed switches.

To provide means for connecting the subassembly 20 with the main printed circuit panel 21, the ends of the strips 24 are provided with circular portions 24a having central apertures which are countersunk to receive the heads of a male connecting pin 29 which extends downwardly through the panel 22 to terminate in a lower rounded end disposed beneath the panel 22. The heads of the pins 29 preferably are soldered to the circular portions 24a. Both surfaces of the subpanel 22 and the components thereon can then be covered with a layer or sheet 30 of thin, flexible dielectric material in the manner described in the copending application of Arthur J. Koda, Serial No. 848,448, filed October 23, 1959, now U.S. Patent No. 3,114,807, which patent is assigned to the same assignee as the present invention. The lower ends of the pins 29 extend through the lower layer 30 of dielectric material to permit electrical connections to be made to these pins. The subassembly 20 is now complete and ready for mounting on the main printed circuit panel 21.

The main printed circuit panel 21 is constructed of a sheet of dielectric material and is provided with a printed circuit pattern on at least one surface thereof including a plurality of thin metallic conducting strips 42. The strips terminate in enlarged segments 42a positioned along a shouldered edge 40 of the panel that forms a male connector. The male connector portion is adapted to be inserted in a female connector to support and extend electrical connections to the assembly 10.

The panel 21 is also provided with a number of openings 21a in accordance with the number of subpanels 20 that are to be mounted on the main panel. Selected ones of the strips 42 are provided with circular end portions 42b located adjacent the edges of the opening 21a in positions that will be aligned with the extending pins 29 on the subassembly 20. The portions 42b are each provided with a central countersunk hole in which is mounted an eyelet 44. Each eyelet or connector 44 includes a funnel-shaped end disposed in the countersunk portion of the opening and the other end of the eyelet 44 is spread or expanded by a punch or die after the eyelet is inserted in the opening. This secures the eyelets in position on the panel and provides good electrical contact with the portions 42b of the strips 42. After the eyelets 44 and the other components completing the electrical circuits on the panel 21 have been assembled, one or both surfaces of the panel 21 can be covered by thin, flexible dielectric sheets 46 in the manner described in the above-identified Koda Patent No. 3,114,807. The areas around the one or both ends of the eyelets 44 are not covered by the dielectric sheets to permit electrical connection to be made thereto.

Figure 5:
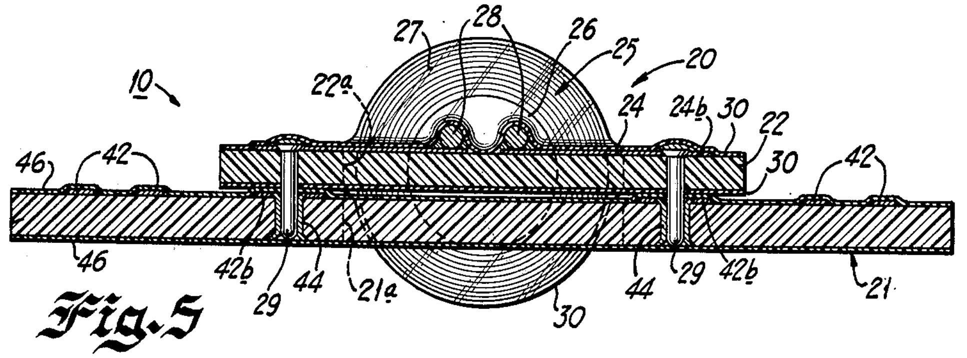
FIG. 5 is a sectional view taken along line 5—5 of FIG. 4.

One or more subassemblies 20 are then mounted on the completed panel 21 by inserting the projecting ends of the pins 29 into the axial openings in the eyelets 44 (FIG. 5). In this position, the openings 21a and 22a are aligned, and the depending portions of the dielectric switch housing 26 and the winding 27 are disposed on the opening 21a. The lower ends (FIG. 5) of the pins 29 are soldered to the eyelets 44 to mechanically secure the subpanels 22 on the main panel 21 and to electrically connect the circuit patterns and electrical components on both of the panels. Since the subpanel 22 is relatively small compared to the main panel 21, it is not deflected to an appreciable degree when the whole assembly 10 is subjected to bending stresses, and the sealed switch units 25 are not subjected to as much strain as they would be when mounted directly on the large panel 21. This reduces the possibilities of damaging the glass-to-metal seals in the switch units 25 during use of the switching assemblies 10. By providing the openings 22a and 21a in the panels 22 and 21 to receive the winding 27 and the switch unit 25, the lateral dimension of the assembly 10 is no greater than the transverse dimension (FIG. 5) of the assembled winding 27 and the switch unit 25.

If it is desired to replace one of the switches 25 on the main panel 21, the soldered connections between the pins 29 and eyelets 44 are melted, and the entire subassembly 20 is removed from the main panel 21 and replaced by a new unit. During this operation, the protective dielectric layers 30 on the subpanel and the similar layers 46 on the main panel 21 are not disturbed, and both panels remain sealed. Moreover, instead of having to stock a large number of costly complete circuit panels having different circuits thereon, rapid replacement of a defective switch unit 25 can be accomplished by stocking only a few types of the smaller and less costly subassemblies 20.

Figure 6:
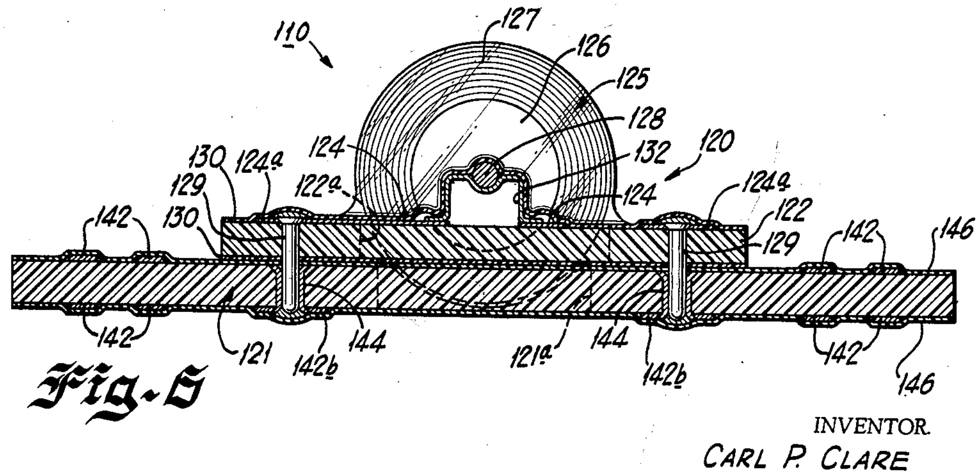
FIG. 6 is a fragmentary sectional view of another embodiment of a switching assembly constructed in accordance with the principles of the present invention.

FIG. 6 illustrates a switching assembly, indicated generally as 110, which forms another embodiment of the present invention. The assembly 110 is similar to the assembly 10, and the reference numbers used in FIG. 6 to indicate parts similar to corresponding parts in the assembly 10 are the same as those used in FIGS. 1–5 with the prefix "1."

The switching or circuit assembly 110 includes a subassembly 120 mounted on and electrically connected to a main printed circuit panel 121. The subassembly 120 includes a printed circuit panel 122 having an opening 122a therein to receive a switching unit 125 that is secured mechanically and connected electrically to a printed circuit pattern on at least one surface of the subpanel. The pattern includes a plurality of thin, metallic conducting strips 124 having circular end portions 124a with central apertures to receive the heads of male connecting pins 129 extending downwardly through the panel 122.

The switching unit 125 includes a tubular dielectric sealed envelope 126 disposed in the axial opening in an operating winding 127 and having at least one terminal 128 extending outwardly from the envelope. The switch unit is supported by means of one or more small metallic cradles or somewhat U-shaped supports 132 having two upstanding legs which are soldered or secured to the strips 124 on the subpanel and a cross member or bight having an indentation to receive the terminal 128 which is soldered or secured thereto. The support 132 can be formed of flexible material to prevent the transmission of forces to the terminals 128 that would tend to destroy the glass-to-metal seals between the terminals 128 and the glass or dielectric housing 126. Although the switching unit 125 is mounted in the opening 122a in the subpanel 122, the larger portion of the switch unit 125 and winding 127 is positioned above the top surface of the subpanel, and only a smaller portion extends below its bottom surface. One or both of the upper and lower surfaces of the subpanel and components thereon can be covered with a thin dielectric layer 130.

The completely assembled subassembly 120 can then be mounted on the main printed circuit panel 121 which is the same as the main panel 21. The main panel 121 includes a printed circuit pattern composed of thin, electrically conductive strips 142 having circular end portions 142b disposed adjacent one or more openings 121a in the panel 121. The end portions 142b are each connected to an eyelet or hollow connector 144 which is mounted on the panel 121 in the same manner as the eyelets 44. The projecting portions of the pin 129 are slidably mounted in the eyelets 144 to position the openings 122*a* and 121*a* in substantial alignment to accommodate the depending portion of the winding 127 and switch unit 125 carried by the subpanel 122. However, as contrasted with the assembly 10, the elevated support 132 for the winding 127 and the switch 125 prevents these components from extending below the lower surface of the panel 121.

This arrangement of the main panel 121 and the subpanel or subpanels 122 permits the subpanels to be secured to the man panel in the same operation in which the other components, such as resistors and capacitors, are connected. As an example, the main panel 121 with the subpanel 122 and other components mounted thereon can be moved through a flow or fountain soldering apparatus in which the component leads as well as the pins 129 are soldered to the printed circuit pattern on the lower surface of the panel 121. Because the lower edge of the sealed switch 125 and its winding 127 lie above the lower surface of the panel 121, the switch unit is not affected by the flow soldering operation. The upper and lower surfaces of the panel 121 can be protected with a dielectric layer 146.

Although the present invention has been described with reference to several illustrative embodiments thereof, it should be understood that numerous other modifications and embodiments can be devised by those skilled in the art that will fall within the spirit and scope of the principles of this invention.

What is claimed as new and desired to be secured by Letters Patent of the United States is:

1. A switching assembly comprising a first dielectric panel having a conductive circuit pattern on at least one surface thereof, said first panel having a first opening spaced inwardly from the edges thereof, a second dielectric panel smaller than said first panel and having a conductive circuit pattern on at least one surface thereof, said second panel having a second opening spaced inwardly from the edges thereof, a sealed switch unit disposed in the second opening and including at least one terminal connected to the conductive circuit pattern on said second panel, and connecting means for mechanically securing said panels together with portions of said second panel overlying said first panel in parallel relation thereto, with the first and second openings in alignment with each other and with the sealed switch unit extending into the first opening, said connecting means also electrically connecting the conductive circuit patterns on the first and second panels.

2. Apparatus defined in claim 1 wherein there are provided thin flexible layers of dielectric material sealingly applied to the opposed surfaces of said second panel and said switch unit.

3. Apparatus defined in claim 1 wherein there are provided thin flexible layers of dielectric material sealingly applied to the opposed surfaces of said first dielectric panel.

4. A switching assembly comprising a first dielectric panel having an upper and lower surface and a conductive circuit pattern on at least the lower surface thereof, said first panel having a first opening spaced inwardly from the edges thereof, a second dielectric panel smaller than said first panel having an upper and lower surface and having a conductive circuit pattern on the upper surface thereof, said second panel having a second opening spaced inwardly from the edges thereof, a sealed switch and winding assembly disposed in the second opening and including at least one terminal, connecting means for mechanically securing said panels together with the second panel overlying said first panel in parallel relation therewith, with the first and second openings in alignment with each other and with the sealed switch and winding assembly extending into the first opening, said connecting means also electrically connecting the conductive circuit patterns on the first and second panels, and conductive support means connected to the terminal and extending upwardly from the upper surface of said second panel to support said sealed switch and winding assembly in a position whereby said assembly does not extend below a level above the lower surface of said first panel when said panels are secured together.

5. Apparatus as defined in claim 4 wherein said conductive support means includes a bracket having an upwardly extending leg, said leg having its lower portion conductively secured to the conductive circuit pattern on said second panel and its upper portion conductively secured to said terminal of said switch and winding assembly.

6. A switching assembly comprising a first dielectric panel having a conductive circuit pattern on at least one surface thereof and defining a first opening spaced inwardly from the edges thereof, a second smaller dielectric panel having a conductive circuit pattern on at least one surface thereof and defining a second opening spaced inwardly from the edges thereof, a sealed switch unit having an elongated dielectric housing and terminals extending from the opposite ends thereof, an electrical winding carried on the housing, the winding and sealed switch unit being disposed within the second opening with the terminals connected to the conductive circuit pattern on the second panel, and means including male connecting members on one of said panels connected to the conductive circuit pattern thereon and female connecting members on the other of the panels connected to the conductive circuit thereon for mechanically and electrically connecting the first and second panels and the conductive circuit patterns thereon, with said second panel overlying portions of said first panel adjacent said first opening therein in parallel relation thereto, the male connecting members being inserted into the female connecting members to position the first and second openings in alignment so that a portion of the winding and sealed switch unit extend into the first opening.

7. A switching assembly comprising a first dielectric panel having an upper and lower surface and having a conductive circuit pattern on at least the lower surface thereof and defining a first opening spaced inwardly from the edges thereof, a second smaller dielectric panel having a conductive circuit pattern on at least one surface thereof and defining a second opening spaced inwardly from the edges thereof, a sealed switch unit having an elongated dielectric housing and terminals extending from the opposite ends thereof, an electrical winding carried on the housing, the winding and sealed switch being disposed within the second opening with the terminals connected to the conductive circuit pattern on the second panel, means including male connecting members on said second panel extending downwardly from the lower surface thereof and connected to the conductive circuit pattern thereon and female connecting members on the first panel connected to the conductive circuit thereon for mechanically and electrically connecting the first and second panels and the conductive circuit patterns thereon, said second panel being disposed to overlie portions of said first panel in parallel relation thereto when the male connecting members are inserted into the female connecting members to position the first and second openings in alignment so that a portion of the winding and sealed switch unit extend into the first opening, said male members terminating adjacent the lower surface of said first panel when inserted in said female members.

8. A switching assembly comprising a first dielectric panel having a conductive circuit pattern on at least one surface thereof and defining a first opening spaced inwardly from the edges thereof, a second smaller dielectric panel having a conductive circuit pattern on at least one surface thereof and defining a second opening spaced inwardly from the edges thereof, sealed switch means having terminals extending outwardly from opposite ends thereof, said switch means being disposed within the second opening with the terminals connected to the conductive circuit pattern on the second panel, and connecting means for mechanically securing the panels together with said second panel in overlying parallel relation to the first panel and with the first and second openings in substantial alignment, said connecting means also adapted for electrically connecting the conductive circuit panels on the first and second panels and including hollow conductive means passing through one of the panels and connected to the conductive circuit pattern thereon and projecting conductive means projecting outwardly from in a direction normal to the other of the panels and connected to the conductive circuit pattern on the other panel, said projecting means being inserted into and electrically and mechanically connected to the hollow conductive means.

9. Apparatus as defined in claim 8 wherein said hollow conducting means includes eyelets having opposed outwardly flared ends positioned adjacent the upper and lower surfaces of said one of said panels.

References Cited by the Examiner

UNITED STATES PATENTS

| | | | |
|---|---|---|---|
| Re. 25,317 | 1/63 | McCoy | 339—17 |
| 2,917,601 | 12/59 | Hatchett | 317—101 |
| 3,030,451 | 4/62 | Jacobson | 200—87 |
| 3,059,152 | 10/62 | Khouri | 174—68.5 |
| 3,062,991 | 11/62 | Kaidan | 317—101 |
| 3,114,807 | 12/63 | Koda | 200—87 |

BERNARD A. GILHEANY, *Primary Examiner.*

ROBERT K. SCHAEFER, *Examiner.*